Patented Dec. 4, 1951

2,577,485

UNITED STATES PATENT OFFICE 2,577,485

PROCESS OF MAKING STABLE SILICA SOLS AND RESULTING COMPOSITION

Joseph M. Rule, Cleveland, Ohio, assignor to E. I. du Pont de Nemours & Company, Wilmington, Del., a corporation of Delaware No Drawing. Application September 8, 1950,
Serial No. 183,902

22 Claims. (Cl. 252—313)

This invention relates to novel silica sols and methods for making them. More particularly, the invention is concerned with sols which are stable, even when concentrated to upwards of 35% $SiO_2$, by reason of the fact that they contain amorphous silica particles which are dense, non-agglomerated, spherical and 10 to 130 millimicrons in diameter, and that they are substantially salt-free and contain enough alkali metal hydroxide to give a silica: alkali mole ratio from 130:1 to 500:1. The invention is further directed to processes for producing such sols wherein a quantity of alkali metal hydroxide sufficient to produce the desired silica : alkali ratio is added to a sol containing amorphous particles which are dense, non-agglomerated, spherical and 10 to 130 millimicrons in diameter, the sol being substantially free of electrolytes.

In application Ser. No. 65,536, filed December 15, 1948, by Bechtold and Snyder and which issued as Patent No. 2,574,902 on November 13, 1951, it has been shown that silica sols which are stable against gelation can be made by heating an aqueous sol of silica particles less than 10 millimicrons in diameter above 60° C. to form a heel, adding to said heel a silica sol containing particles less than 10 millimicrons in diameter, and continuing the addition and heating until at least five times as much silica has been added to the heel as was originally present. The sols thus formed are characterized by having a silica : alkali ratio of from 60:1 to 130:1 and by being stable against gelation for extended periods. The sols are restricted in their usefulness by the fact that they are not very compatible with water-soluble organic liquids such as alcohols and ketones and by the further fact that when the sols are frozen the silica is precipitated in a form which is not readily redispersible.

In application Ser. No. 97,090, filed June 3, 1949, by Wolter, now abandoned, it is shown that a sol such as that described by Bechtold and Snyder may be deionized by subjecting the sol to successive contact with a cation exchanger and an anion exchanger. The sol is comparatively unstable after complete purification by this method, particularly at higher concentrations—that is, at concentrations above about 30% $SiO_2$. As shown in application Ser. No. 138,933 filed January 16, 1950, by Wolter, the sol can be stabilized by adding a nitrogen base such as an organic amine or a quaternary ammonium hydroxide. For some uses the presence of small amounts of such bases is advantageous, as for instance, when a volatile base is desired; for other uses of the sol, however, the presence of a nitrogen base may not be desirable, and in these situations no method for stabilizing a deionized sol has hitherto been known. Furthermore, when it is attempted to concentrate sols stabilized with a volatile nitrogen base, the sols gel rather quickly when the volatile base is removed.

It is an object of this invention to provide aqueous silica sols which are compatible with water-soluble organic liquids. Another object is to provide aqueous silica sols which, after freezing in the presence of an alcohol or other organic liquid, are readily redispersible. Another object is to provide silica sols in which stability against gelling is achieved without the necessity of having present a nitrogen base. Another object is to provide silica sols which are stabilized with a base of an alkali metal, the ratio of silica to alkali metal being in the range from 130:1 to 500:1, and which contain more than 30% $SiO_2$. Another object is to provide processes for producing such sols.

The foregoing and related objects are accomplished according to the present invention by novel sols containing amorphous silica particles which are dense, non-agglomerated, spherical and 10 to 130 millimicrons in diameter, the sols being substantially salt-free and containing enough alkali metal hydroxide to give a silica : alkali mole ratio of from 130:1 to 500:1, and are further accomplished by processes for producing such sols wherein a quantity of alkali metal hydroxide sufficient to produce the desired silica : alkali ratio is added to a sol containing amorphous silica particles which are dense, non-agglomerated, spherical and 10 to 130 millimicrons in diameter, the sol being substantially free of electrolytes.

The silica particles in a sol of this invention are amorphous, giving no evidence of crystallinity as determined by conventional X-ray diffraction methods. That the particles are dense is indicated by measuring their surface area on an electron micrograph and comparing this value with the surface area as determined by nitrogen adsorption, a fairly close agreement indicating that the particles are substantially free of pores penetrable by nitrogen. The non-agglomerated nature of the silica particles is shown by the fact that the sols have a relative viscosity of from 1.15 to 1.55, as measured at 10 per cent $SiO_2$ and at pH 10; agglomerated particles would give a higher relative viscosity. The spherical character of the particles, and their average size, is observable by means of the electron microscope. A dilute sol, containing 0.25 per cent $SiO_2$ by weight, may for instance, be dried down and prepared for observation in the customary manner, and from the electron micrograph it will be observed that the particles are spherical and non-agglomerated, the individual ultimate particles having an average size of from 10 to 130 millimicrons.

The salt-free nature of the sols is indicated by the fact that they have a specific conductance less than $$\left(\frac{10,000}{R}+30\right)\times 10^{-5} \text{ mho/cm.}$$

where R is the $SiO_2$ : alkali metal oxide mole ratio, the conductance being determined, at 28° C. and 10% by weight of $SiO_2$, by conventional methods. The mole ratio of $SiO_2$ to alkali metal oxide in the sols is from 130:1 to 500:1, as determined by ordinary analytical procedures such as titration with acid.

In the processes of the invention there is first prepared a silica sol containing dense, non-agglomerated silica particles having an average diameter of from 10 to 130 millimicrons as observed by the electron microscope, the sol having a relative viscosity, as measured at 10% $SiO_2$ and pH 10.0, of 1.15 to 1.55, and a specific conductance less than $4\times 10^{-4}$ mho/cm. at 28° C. and 10% $SiO_2$. To this sol there is then added an alkali metal hydroxide, such as sodium, potassium, or lithium hydroxide. The quantity of hydroxide added is enough to give a silica : alkali oxide mole ratio in the sol of from 130:1 to 500:1.

It has been found that the aqueous silica sols produced as just described are stable against gelation. At ordinary temperatures of storage they are stable indefinitely, and even at temperatures as high as 95° C. they are stable for extended periods. They have improved compatibility with alcohols such as ethanol, isopropanol, and ethylene glycol, ketones such as acetone, ethers such as butyl Carbitol, amines such as ethanolamine, and other organic liquids. The sols containing a relatively small proportion of an organic liquid such as an alcohol are resistant to freezing at low temperatures, but even if the sols are frozen, the silica is readily dispersible in the liquid medium after thawing.

The aqueous sols may be concentrated to a very high silica content merely by boiling off water. Sols which are stable against gelation for extended periods of time may be readily prepared containing silica in proportions as high as 50% by weight or more. These concentrated sols have a surprisingly low viscosity, and when the particles are in the smaller size range the turbidity may be not greater than a faint opalescence. As compared with silica sols heretofore available at high concentration, the sols of this invention have substantially improved film forming characteristics.

PROPERTIES OF THE SOL TREATED

The aqueous silica sols which are amenable to treatment according to a process of this invention have certain well-defined physical and chemical properties. These properties are defined in terms of the size, shape, and density of the silica particles and their freedom from agglomeration, and the relative viscosity and specific conductance of the sols, as will now be fully described.

To be suitable for use in a process of this invention a sol must contain silica in the form of dense, non-agglomerated particles having an average diameter of from 10 to 130 millimicrons. In a preferred embodiment of the invention the average particle size is in the range from 13 to 60 millimicrons, and in a specific embodiment, giving especially advantageous results, the average particle size is from 15 to 30.

The size of the silica particles and the fact as to whether or not they are non-agglomerated, that is—substantially discrete, can be directly observed by means of an electron microscope. Since the limit of resolution of the electron microscope is well below the 10 millimicron limit of the particles, there is no difficulty is ascertaining whether particles of the desired range are present. On the other hand, sols prepared according to many conventional methods contain substantially no particles of the desired size range but contain aggregates of much smaller ultimate particles, and such aggregates should not be confused with the discrete particles herein referred to. Ordinarily, when a substantial proportion of aggregates of such under-size particles are present the relative viscosity is too high, and the lack of suitability will thus be indicated by the relative viscosity determination referred to hereinafter.

In determining the size of silica particles by the electron microscope there is some densification effected in the preparation of the sample. This is minimized by drying the sample at room temperature, under vacuum. Thus, the particle size limitation of 10 to 130 millimicrons referred to in the description of this invention is the size of particles as observed on an electron microscope on a sample originally containing 0.25% $SiO_2$ in water and dried at 25° C. under vacuum. The method of counting and measuring particles is described by Schaeffer et al., in Journ. Phys. and Colloid Chem., 54, pp. 227–239 (February 1950).

The size uniformity of the silica particles in a sol may be determined by direct measurement and count on an electron micrograph prepared as above-described. In a particular, preferred sol product of this invention the silica particles are relatively uniform in size, and since the size uniformity of the particles does not change substantially during the operation of a process of the invention, it is necessary in making this product to start with a sol of relatively uniform particles. The uniformity should be such that at least 80 per cent of the particles have an average diameter of from 0.5 to 1.7 times the arithmetic mean particle diameter as determined from electron micrographs. If, for example, the diameter of the mean particle is 60 millimicrons, 80 per cent of the mass of silica present will be in the form of particles having diameters in the range from 30 to 102 millimicrons.

The shape of the silica particles in a sol to be treated should be substantially spherical, as observed on an electron micrograph. Also, if the particles are substantially spherical the sol will conform to the Einstein viscosity relationship for spheroidal particles. The presence of an undue proportion of rod-shaped or other non-spheroidal shapes or forms of particles will cause the relative viscosity to be higher than the maximum permissible.

The density of the silica particles present may be determined by comparing their surface areas as calculated from electron micrographs with the surface areas as determined by nitrogen adsorption. On a suitably prepared electron micrograph it is possible to measure the particle diameters and from this measurement the specific surface area—that is, the surface area per gram of silica, can be calculated on the assumption that the particles are substantially spherical and the spheres have a smooth external surface. Independently, the specific surface area may be determined by nitrogen adsorption. Such a method is described in "a new method for measuring the surface areas of finely divided materials and for determining the size of particles" by P. H. Emmett in "Symposium on New Methods for Particle Size Determination in the Subsieve Range" in the Washington Spring Meeting of A. S. T. M., March 4, 1941.

When evaporating a sol to dryness for nitrogen adsorption determinations on the particles therein, the pH is important, because if the sol is evaporated in the basic pH range the apparent nitrogen adsorption will be significantly less than on particles from a sol evaporated in the acidic pH range of, say, 3 to 5. Consequently, in preparing the silica for surface area determinations, the sol should first be adjusted to a pH of about 3.5, and the water should be allowed to evaporate at a temperature of 100° C. or below.

If the specific surface area as determined by nitrogen adsorption is not substantially greater, for example not more than 25% greater, than the specific surface area as calculated from electron micrographs the particles are dense and the sol is suitable for use in a process of this invention. If the silica particles are porous they will be penetrated by nitrogen and the nitrogen adsorption will be relatively high, and consequently the specific surface area by nitrogen adsorption will also be high—much higher than would be expected on the basis of the direct observation of the particles by means of the electron microscope. On the other hand, if the specific surface area by nitrogen adsorption is not substantially greater than that calculated from electron micrographs, the particles are what they appear to be on the micrographs—namely, substantially smooth, non-agglomerated, non-porous spheres. In many of the determinations on sols of this invention, the specific surface by nitrogen adsorption is about 25% greater than the specific surface by calculation from electron micrographs, where the definition in the micrographs is sharp and the particles are clearly not grown together.

Relative viscosity refers to the ratio of the viscosity of a solution to the viscosity of the solvent. In the present instance the solution is the silica sol and the solvent is water which optionally may contain an organic liquid. The viscosity is measured at 25° C. on a sol having a pH of 10 and containing 10% $SiO_2$ by weight. A sol which is electrolyte-free must be adjusted to pH 10 for the purpose of this measurement by the addition of sodium hydroxide. A sol containing less than 10% $SiO_2$ may be concentrated up to 10% by vacuum evaporation of water at room temperature and a more concentrated sol may be diluted back with water to 10% for measurement.

The viscosity measurements used in determining relative viscosity may be made according to conventional methods provided they are capable of adequate precision. Measurements made with a capillary pipette, for instance, under properly controlled conditions of temperature are adequate for the purpose.

The relative viscosity of a sol treated according to a process of this invention should be 1.15 to 1.55 measured at 10% $SiO_2$. Sols having a lower viscosity contain the silica in the form of low molecular weight polymers which are susceptible to further polymerization during the course of the process or thereafter, with resultant gelation. Sols having a relative viscosity higher than 1.55, on the other hand contain particles of silica gel or non-spheroidal particles, which interfere with the concentration of the sols to high silica contents.

When the sol product to be produced by a process of this invention is to contain more than about 40% $SiO_2$ by weight and have maximum stability against gelation, it is preferred that the relative viscosity of the sol to which alkali is added be in the range of 1.15 to 1.30 as measured at 10% $SiO_2$, because under these circumstances it is particularly desirable to avoid the presence of gel-like or non-spheroidal particles.

The ionic content of a sol to be treated according to this invention must be quite low. Ideally, the ionic content should consist of only traces of either cations or anions, but as a practical matter, somewhat larger amounts can be tolerated as hereinafter described.

The specific conductance of a silica sol which is to be treated according to this invention may be determined in accordance with conventional practices, such as that described by Glasstone, "Text-Book of Physical Chemistry," at page 874 et. seq. The specific conductance is measured at 28° C. on a sol containing 10 per cent by weight of silica expressed as $SiO_2$. More concentrated sols may be diluted with distilled water for measurement. The specific conductivity of a suitable sol should not exceed about $4 \times 10^{-4}$ mho/cm.

When it is intended that the final sol product to be produced according to the invention shall contain more than about 40% $SiO_2$ by weight and yet have maximum stability, it is preferred that the sol to which alkali is added have a specific conductivity considerably less than $4 \times 10^{-4}$ mho/cm. as measured at 10% $SiO_2$, and should not exceed about $1 \times 10^{-4}$ mho./cm. If it is desired to concentrate the final product above about 45% $SiO_2$ the specific conductance should not exceed about $6 \times 15^{-5}$ mho/cm.

Having set up criteria by which a suitable sol may be judged methods will now be described by which silica sols may be prepared for treatment according to a process of the present invention.

PREPARATION OF THE SOL TO BE TREATED

By various processes known in the prior art, sols of low molecular weight silica can be prepared, and such sols may then be converted to sols containing the desired dense, non-agglomerated particles from 10 to 130 millimicrons in diameter by building up the particles, starting with suitable nuclei. The low molecular weight sol may be made, for instance, by neutralizing sodium silicate with sulfuric acid and dialyzing out the salt formed. Other methods include hydrolyzing silicate esters, silicon halides, or silicon sulfide, subjecting a sodium silicate solution to electro-osmosis, or electrolyzing a sodium silicate solution with a lead anode and mercury cathode. A particularly preferred method of making a low molecular weight sol is that of the Bird Patent 2,244,325.

According to the Bird patent an alkali metal silicate solution such as sodium silicate is passed through an ion-exchange material which removes most of the metal ions and gives a silica sol having a high ratio of silica to sodium. Alternatively, all the metal ions may be removed, in which case the sol may then be adjusted to a desired ratio by adding a requisite amount of sodium silicate or sodium hydroxide solution, taking care not to permit the sol to remain long in the pH range of 5 to 7 since in this range it is relatively unstable. It will be observed that the effluent from the ion exchanger is a sol in which the silica is of low molecular weight.

The low molecular weight silica in any of these sols just described may be condensed to form dense, discrete particles greater than 10 millimicrons in diameter by recently discovered techniques such as are described in application Ser. No. 65,536, filed December 15, 1948, by Bechtold and Snyder. Silica sols of dense particles which are preferred for use according to the present invention may be made according to such processes by heating a silica sol, prepared by ion exchange in the manner described in Bird 2,244,325 and stabilized with a small amount of alkali, to a temperature above 60° C. and adding further quantities of the same type of sol until at least five times as much silica has been added to the original quantity as was at first present. The product thus produced is stable against gelation at the pH of the present processes and it contains non-agglomerated silica particles having a molecular weight, as determined by light scattering, of more than one-half million. The particle sizes are in excess of about 10 millimicrons and range upwardly to about 130 millimicrons. The particles in a particular sol are surprisingly uniform in size, but the size can be varied depending upon the process conditions under which they are formed. The sols have a relative viscosity as measured at 10% $SiO_2$ and pH 10, of 1.15 to 1.55.

The content of ions in a sol prepared from commercial materials by a process such as just described is sufficient to make the specific conductance of the sol greater than $4 \times 10^{-4}$ mho/cm. at 28° C. and 10% $SiO_2$, and hence the ion content requires adjustment before treatment of the sol according to a process of the present invention. The sols have a silica:alkali oxide mole ratio of from 60:1 to 130:1. It is necessary to decrease the cation content, and while this may be done in various ways, such as dialysis on the built-up sol, it is especially preferred to decrease the cation content by passing the sol through a cation exchange resin in the hydrogen form. Any insoluble cation-exchanger may be used for this purpose, the resins of sulfonated carbonaceous exchangers, or of sulfonated or sulfited insoluble phenolformaldehyde resins, or acid-treated humic material, or other similar exchangers, being typical. Sulfonated coal, lignin, peat, or other insoluble sulfonated humic organic material may be used. Even more preferable are the insoluble resins made from phenols, such as those made from phenol itself, diphenylol sulfone, catechol, or naturally occurring phenols, as found, for example, in quebracho, and an aldehyde, particularly formaldehyde, which are modified by the introduction of sulfonic groups either in the ring or on methylene groups. Cation-exchangers which are stable in their hydrogen form are available commercially under such trade names as "Amberlite," "Ionex," "Zeokarb," "Nalcite," "Ionac," etc.

The exchanger should be initially in the acid form. It will be understood that to regenerate a spent exchanger to the acid form even moderately weak acids will often be sufficient particularly if the acidity is derived from carboxylic acids or even phenolic groups.

The exchanger is generally prepared in a granular form which is readily leached free of soluble acids or salts. If the exchanger is exhausted by use it may readily be converted to the acid form by washing with a solution of an acid such as hydrochloric, sulfuric, formic, sulfamic, carboxylic, or the like.

One of the preferred cation-exchange resins for use according to the present invention is an aromatic hydrocarbon polymer containing nuclear sulfonic acid groups which is designated "Dowex 50" and of the general type described in D'Alelio 2,366,007 and which is fully described as to its characteristics, properties, and general mode of use in the Journal of the American Chemical Society for November 1947, volume 69, No. 11, beginning at page 2830.

For convenience of reference suitable silica sols from which cations have been substantially completely removed by ion exchange as just described may be referred to as "half-cycle deionized" sols.

Sols prepared according to the disclosure of Bechtold and Snyder application above mentioned may contain varying amounts of anions such as sulfate, chloride, carbonate and bicarbonate, or the like. By carefully controlling the processes to avoid contamination by anions, the anion concentration, and hence, the specific conductance, may be held low enough so that the sol may be treated according to a process of the present invention without further adjustment of the anion content. Using deionized water for making up all solutions and carefully avoiding acid contamination of the sol from the regeneration of the cation exchange resin are expedients which may be followed to keep down the anion content. However, in some circumstances it is not practicable to observe these precautions and it is accordingly preferred to reduce the anion content if required by passing the sol through an anion exchanger in the basic form.

Anion exchangers are generally well known, and the composition of the anion exchangers and their mode of use are fully described in the literature. Suitable materials are mentioned, for instance, in U. S. Patents 2,438,230 and 2,422,054. A description of both cation- and anion-exchangers will be found in the May 1945 issue of "Chemical Industries" in an article entitled "Ion-exchange" by Sidney Sussman and Albert B. Mindler at pages 789 et seq.

While any of the anion-exchangers described will be found satisfactory, the insoluble resins obtained by the reaction of formaldehyde with an aromatic amine are particlarly useful. Such products are described, for instance, in the U. S. Patent 2,151,883 of Adams and Holmes. Reference is made, for instance, to the metaphenylenediamineformaldehyde type of anion-changer in the Ryznar Patent 2,438,230 stated above. A guanidine-type anion-exchanger may also be used.

As with the cation-exchangers, the technique of use is generally well understood and the anion-exchangers may be used in the manners customary in the art. It will be understood again that a considerable excess of anion-exchanger will ordinarily be used and the sulfate and chloride content will be lowered to an exceedingly low value.

By the treatment with the anion-exchanger the content of anions other than OH will drop to an exceedingly low figure and will not total more than about two hundredths to three hundredths of a per cent.

A silica sol which has been subjected to both cation- and anion-exchange as above described may be referred to as a "full-cycle deionized" sol. The preparation of such sols is the subject of application Ser. No. 97,090, filed June 3, 1949, by F. J. Wolter now abandoned.

The sol which is subjected to deionization as above described may be relatively dilute, containing as little as a few per cent of $SiO_2$, but it is particularly preferred to conduct the ion exchange process upon relatively concentrated sols—that is, above about 20% $SiO_2$. A sol which has had the cations substantially removed at high silica concentration has some tendency toward gelling, and the treatment of such a sol according to a process of this invention preferably is carried out as soon as feasible after the deionization is effected.

THE TREATMENT WITH ALKALI METAL HYDROXIDE

By a method set forth above there may be prepared a silica sol containing amorphous silica particles which are dense, non-agglomerated, spherical, and 10 to 130 millimicrons in diameter, the sol being substantially free of electrolytes. The treatment of such a sol with an alkali metal hydroxide according to a process of this invention will now be described.

The alkali metal hydroxide used may be the hydroxide of lithium, sodium, potassium, rubidium or caesium. The hydroxides of lithium, sodium and potassium are particularly effective, and when it is desired that the sol have maximum compatibility with organic substances such as alcohols, it is particularly preferred to add lithium hydroxide. It will be observed that the method of the present invention provides a process whereby one alkali metal cation may be substituted for another in a silica sol. Thus, by the methods of Bechtold and Snyder described above, a silica sol may be made which is associated with sodium in such amounts that the $SiO_2 : Na_2O$ ratio is from 60:1 to 130:1, and the present method provides a means for replacing the sodium with more-desired cations such as lithium at ratios of 130:1 to 500:1.

The alkali metal hydroxide may be added as a solid or as a solution, the latter mode of addition being preferred. It is also preferred, although not absolutely necessary, that the hydroxide solution be added to the silica sol or that the hydroxide solution and silica sol be added simultaneously to a heel of suitable liquid, rather than that the sol be added to the hydroxide solution. It is also preferable that agitation be provided to effect prompt mixing of the hydroxide and sol.

It will be understood that the addition of an alkali metal oxide or a soluble alkali metal silicate is the equivalent of adding an alkali metal hydroxide because as soon as the oxide or silicate makes contact with the aqueous silica sol it forms the hydroxide. Furthermore, an equivalent practice is to add, to a completely deionized sol, a sol which has first been completely deionized and then adjusted to a low silica : alkali ratio by adding back a relatively large amount of alkali metal hydroxide.

The amount of alkali metal hydroxide or its equivalent added to a silica sol by a process of this invention should be enough to adjust the silica : alkali ratio of the sol to from 130:1 to 500:1. The ratio referred to is the mole ratio of silica, calculated as $SiO_2$, to alkali metal hydroxide, calculated on the basis of stoichiometric equivalency to sodium oxide.

After the ratio of the sol has been adjusted with an alkali metal hydroxide as just described, the sol may advantageously be subjected to further processing. The sol may, for instance, be concentrated by evaporation of water. This evaporation may be carried out at ordinary pressure or under reduced pressure, the choice being dictated by economics. It is a unique feature of this invention that the sols may be concentrated to very high silica concentrations, the silica content being carried to as high as 50% $SiO_2$ or more without gelation. For products of highest silica content, it is preferable to use a sol containing a minimum of anions and having a silica : alkali ratio of from 150 to 300, and more particularly about 200.

A further unique feature of this invention is that the treated sols are to a considerable degree compatible with water-soluble organic liquids. The organic liquid may be added directly to the treated sol at either low or high silica concentration. Again it is preferred, when organic liquids are to be added, that the soluble salt content of the sol be at a minimum, although substantial organic compatibility is found even with sols containing the maximum amount of soluble salts permissible in a sol of this invention.

The water-soluble organic liquid which may be added to make a sol of this invention may be an alcohol such as ethanol, isopropanol, or ethylene glycol, a ketone such as acetone or methyl ethyl ketone, an ether such as butyl Carbitol, an amine such as ethanolamine or trimethylamine, or another organic liquid. Addition of such organic liquids imparts freeze resistance to the sols and makes the silica dispersible even after freezing.

THE NOVEL SILICA SOL PRODUCTS

The silica sols produced according to the processes above described are of novel character. They are aqueous silica sols which have a silica : alkali ratio of from 130:1 to 500:1, a relative viscosity of from 1.15 to 1.55 as measured at 10% $SiO_2$ and at pH 10, and a specific conductance of less than $$\left(\frac{10,000}{R}+30\right) \times 10^{-5} \text{ mho/cm.}$$

where R is the silica : alkali metal oxide mole ratio, and which contain amorphous silica in the form of dense, non-agglomerated, spherical particles having an average particle diameter of 10 to 130 millimicrons.

The sols may have a silica content of from a useful amount up to as high as 50% or more, the sols being stable even at concentrations of from 35 to upwards of 50% $SiO_2$. When the silica content is more than 50% the sol becomes quite viscous and does not flow readily.

The more concentrated sols represent a preferred embodiment of this invention. The sols containing more than 35% by weight of silica have substantial commercial advantages over more dilute sols, and these advantages become successively more pronounced at silica concentrations greater than 40 and 45%. However, for maximum stability of the sols against gelation at concentrations of 40% $SiO_2$ and above, it is preferred that the upper limit of relative viscosity be not greater than 1.30 and the specific conductance be not greater than $$\left(\frac{10,000}{R}+6\right)\times 10^{-5} \text{ mho/cm.}$$

where R is the $SiO_2$ : alkali oxide mole ratio.

The sols may contain a water-soluble organic liquid as above described. The proportion of organic liquid may advantageously be from 1 to 50% by weight, based on the silica, from 5 to 20% being preferred.

The sols are useful for all purposes where a silica intimately dispersed in a liquid continuous phase is desired. They are effective for treating textiles and textile fibers such as cotton, rayon, and wool. They can be used for treating paper for such purposes as increasing the stiffness or increasing the contrast of photocopying papers. They may be employed advantageously for plumping tanned leather such as chrome-tanned leather.

By reason of their excellent organic compatibility the sols are especially useful for adding to paints to increase the scrub resistance and for adding to waxes, especially self-polishing wax emulsions, to increase the slip resistance of the coating produced therefrom. As compared with silica sols containing larger amounts of electrolyte, they have improved film-forming characteristics and hence are particularly adapted for uses wherein film-forming ability is desired.

EXAMPLES

The invention will be better understood by reference to the following illustrative examples:

Example 1

The sol utilized in this example was prepared from a commercially available silica sol containing relatively large amounts of electrolytes as indicated by both chemical analysis and conductivity measurement. This material gelled upon the addition of ethyl or isopropyl alcohol, and upon freezing solidified to a material which could not be redispersed upon warming. In order to prepare the novel sols of this invention, the impure sol was treated first with the hydrogen form of a cation exchanger, Nalcite HCR, and then with the basic form of an anion exchanger, Amberlite IR4B. The latter resin removed strong acids such as sulfuric and hydrochloric, but did not retain weak acids such as silicic. The resulting sol was essentially pure silica as shown by the typical chemical analysis in Table I for a sol which had been purified in this manner.

TABLE I
*Analysis of purified sol*

| | |
|---|---|
| $SiO_2$ | 28.73% |
| Na | 0.03% |
| $SO_4$ | 0.005% |
| Cl | Not detectable |
| Sulfated non-siliceous ash | 0.12% |

This purified sol was more completely characterized by its following properties:

TABLE II
*Properties of purified sol*

| | |
|---|---|
| pH | 3.7 |
| Specific conductance (measured at 10% $SiO_2$) | $6\times 10^{-5}$ mho/cm. |
| Relative viscosity ($SiO_2$=10%; T=25° C.; pH=10) | 1.20 |
| Density (T=25° C.) | 1.185 g./cc. |
| Turbidity [1] | 67% |
| $D_n$ [2] | 16 millimicrons |
| $S_n$ [3] | 181 m.²/g. |

Compatibility: Excellent with acetone, ethanol, morpholine, pyridine, and dioxane.

[1] Turbidity is defined as percentage transmission as measured in a Beckmann spectrophotometer, model DU, set at 400 millimicrons utilizing an absorption path of 1.00 cm.
[2] $D_n$ is defined as the average particle diameter in millimicrons based on the random measurement of more than 300 particles from an electron micrograph of the sol particles.
[3] $S_n$ is the actual surface area per gram, as measured by nitrogen adsorption, of dried powder obtained by allowing a portion of the sol to slowly evaporate at room temperature.

This purified sol was unstable to both heating and freezing but was modified according to processes of this invention to yield stable, useful products as follows:

The purified sol (1200 parts) was mixed with 58 parts of 1 N lithium hydroxide to give a sol having an $SiO_2$ : $Li_2O$ mol ratio of 200:1, and the resulting material concentrated until the silica content reached 40%. Then isopropyl alcohol (24 parts) was added, and the improved silica sol characterized. It exhibited excellent compatibility with acetone, alcohol, pyridine, and morpholine, and could be mixed with many water soluble organic polymers such as polyvinyl alcohol, gelatin and certain cellulose derivatives to form unique materials. The sol was resistant towards freezing and did not thicken or gel upon prolonged storage at elevated temperatures. The specific conductance for this material was $4.2\times 10^{-4}$ mho/cm., as measured at 28° C. and 10% $SiO_2$.

Example 2

A purified sol (890 parts) prepared as described in Example 1 was mixed with sodium hydroxide (17 parts of 1 Normal aqueous solution) to yield a sol having an $SiO_2$ : $Na_2O$ mole ratio of 500. The resulting sol had a pH of 8.2 and could be concentrated to a silica content of 44% by merely boiling off the necessary amount of water under rapid agitation. The resulting sol with its high silica content was fairly viscous at ordinary temperatures, but it became very fluid when warmed to about 80° C. The concentrated sol was stable towards gelation after one month's storage at 95° C. and its viscosity did not change during several months' storage at ordinary temperatures. The specific conductance of this sol as measured at 28° C. and a silica content of 10 per cent was $2.5\times 10^{-4}$ mho/cm.

This highly concentrated silica sol was compatible with many water miscible organic solvents such as acetone, alcohol, ethylene glycol, and dioxane, and could be rendered resistant toward freezing by the addition of 21 parts ethyl alcohol.

Example 3

Another portion (890 parts) of a purified sol, prepared as in Example 1 and characterized as in Table I and Table II of that example, was modified with enough sodium hydroxide (1 Normal aqueous solution) to change the pH of the sol to a value of 9.5. This corresponded to an $SiO_2$ : $Na_2O$ mole ratio of 150. The stabilized sol was then concentrated by boiling off water under rapid agitation until the silica content reached a value of 46 per cent. The resulting sol was relatively clear, with only a slight opalescent appearance and was stable toward gelation after one months storage at 95° C. The specific conductance of this sol as measured at 28° C. and a silica content of 10 per cent was $4.8\times 10^{-4}$ mho/cm. When the concentrated sol was diluted to a silica content of 10 per cent, its relative viscosity measured as prescribed was 1.20.

The properties of this sol were essentially the same as those of the sols previously described in Examples 1 and 2.

I claim:

1. In a process for producing a stable silica sol, the step comprising adding an alkali metal hydroxide to a silica sol containing amorphous silica particles which are dense, non-agglomerated, spherical, and have an average diameter of 10 to 130 millimicrons, the sol having a concentration of up to 50% by weight of $SiO_2$, a relative viscosity, as measured at 10% $SiO_2$ and pH 10, of 1.15 to 1.55 and a specific conductance, as measured at 10% $SiO_2$ and 28° C., of less than $4 \times 10^{-4}$ mho/cm., the amount of hydroxide added being enough to adjust the silica : alkali metal oxide mole ratio to from 130:1 to 500:1.

2. In a process for producing a stable silica sol, the step comprising adding lithium hydroxide to a silica sol containing amorphous silica particles which are dense, non-agglomerated, spherical, and have an average diameter of 10 to 130 millimicrons, the sol having a concentration of up to 50% by weight of $SiO_2$, a relative viscosity, as measured at 10% $SiO_2$ and pH 10, of 1.15 to 1.55 and a specific conductance, as measured at 10% $SiO_2$ and 28° C., of less than $4 \times 10^{-4}$ mho/cm., the amount of hydroxide added being enough to adjust the silica : lithium oxide mole ratio to from 130:1 to 500:1.

3. In a process for producing a stable silica sol, the step comprising adding sodium hydroxide to a silica sol containing amorphous silica particles which are dense, non-agglomerated, spherical, and have an average diameter of 10 to 130 millimicrons, the sol having a concentration of up to 50% by weight of $SiO_2$, a relative viscosity, as measured at 10% $SiO_2$ and pH 10, of 1.15 to 1.55 and a specific conductance, as measured at 10% $SiO_2$ and 28° C., of less than $4 \times 10^{-4}$ mho/cm., the amount of hydroxide added being enough to adjust the silica : sodium oxide mole ratio to from 130:1 to 500:1.

4. In a process for producing a stable silica sol, the step comprising adding an alkali metal hydroxide to a silica sol containing amorphous silica particles which are dense, non-agglomerated, spherical, and have an average diameter of 10 to 130 millimicrons, the sol having a relative viscosity, as measured at 10% $SiO_2$ and pH 10, of 1.15 to 1.55 and a specific conductance, as measured at 10% $SiO_2$ and 28° C., of less than $4 \times 10^{-4}$ mho/cm., the amount of hydroxide added being enough to adjust the silica : alkali metal oxide mole ratio to from 130:1 to 500:1, and concentrating the sol to a silica content of from 35 to 50% by weight.

5. In a process for producing a stable silica sol, the steps comprising adding an alkali metal hydroxide to a silica sol containing amorphous silica particles which are dense, non-agglomerated, spherical, and have and average diameter of 10 to 130 millimicrons, the sol having a relative viscosity, as measured at 10% $SiO_2$ and pH 10, of 1.15 to 1.30 and a specific conductance, as measured at 10% $SiO_2$ and 28° C., of less than $1 \times 10^{-4}$ mho/cm., the amount of hydroxide added being enough to adjust the silica : alkali metal oxide mole ratio to from 130:1 to 500:1, and concentrating the sol to a silica content of from 40 to 50% by weight.

6. In a process for producing a stable silica sol, the steps comprising adding an alkali metal hydroxide to a silica sol containing amorphous silica particles which are dense, non-agglomerated, spherical, and have an average diameter of 13 to 60 millimicrons, the sol having a relative viscosity, as measured at 10% $SiO_2$ and pH 10, of 1.15 to 1.30 and a specific conductance, as measured at 10% $SiO_2$ and 28° C., of less than $1 \times 10^{-4}$ mho/cm., the amount of hydroxide added being enough to adjust the silica : alkali metal oxide mole ratio to from 130:1 to 500:1, and concentrating the sole to a silica content of from 40 to 50% by weight.

7. In a process for producing a stable silica sol, the steps comprising adding an alkali metal hydroxide to a silica sol containing amorphous silica particles which are dense, non-agglomerated, spherical, and have an average diameter of 10 to 130 millimicrons, the sol having a relative viscosity, as measured at 10% $SiO_2$ and pH 10, of 1.15 to 1.30 and a specific conductance, as measured at 10% $SiO_2$ and 28° C., of less than $6 \times 10^{-5}$ mho/cm., the amount of hydroxide added being enough to adjust the silica : alkali metal oxide mole ratio to from 130:1 to 500:1, and concentrating the sol to a silica content of from 45 to 50% by weight.

8. In a process for producing a stable silica sol, the steps comprising adding an alkali metal hydroxide to a silica sol containing amorphous silica particles which are dense, non-agglomerated, spherical, and have an average diameter of 15 to 30 millimicrons, the sol having a relative viscosity, as measured at 10% $SiO_2$ and pH 10, of 1.15 to 1.30 and a specific conductance, as measured at 10% $SiO_2$ and 28° C., of less than $6 \times 10^{-5}$ mho/cm., the amount of hydroxide added being enough to adjust the silica : alkali metal oxide mole ratio to from 130:1 to 500:1, and concentrating the sol to a silica content of from 45 to 50% by weight.

9. In a process for producing a stable silica sol, the step comprising adding an alkali metal hydroxide to a silica sol containing amorphous silica particles which are dense, non-agglomerated, spherical, and have an average diameter of 10 to 130 millimicrons, and a uniformity of size such that at least 80% of the particles have an average diameter of from 0.5 to 1.7 times the arithmetic mean particle diameter, the sol having a concentration of up to 50% by weight of $SiO_2$, a relative viscosity, as measured at 10% $SiO_2$ and pH 10, of 1.15 to 1.55 and a specific conductance, as measured at 10% $SiO_2$ and 28° C., of less than $4 \times 10^{-4}$ mho/cm., the amount of hydroxide added being enough to adjust the silica : alkali metal oxide mole ratio to from 130:1 to 500:1.

10. In a process for producing a stable silica sol, the steps comprising treating with a cation exchanger and an anion exchanger a silica sol containing amorphous silica particles which are dense, non-agglomerated, spherical, and have an average diameter of 10 to 130 millimicrons, the sol having a concentration of up to 50% by weight of $SiO_2$, a relative viscosity, as measured at 10% $SiO_2$ and pH 10, of 1.15 to 1.55 and a specific conductance, as measured at 10% $SiO_2$ and 28° C., of more than $4 \times 10^{-4}$ mho/cm., continuing the ion exchange treatment until the specific conductance is less than $4 \times 10^{-4}$ mho/cm., as measured at 10% $SiO_2$ and 28° C., and then adding an alkali metal hydroxide to the sol, the amount of hydroxide added being enough to adjust the silica : alkali metal oxide mole ratio to from 130:1 to 500:1.

11. In a process for producing a stable silica sol, the steps comprising adding an alkali metal hydroxide to a silica sol containing amorphous silica particles which are dense, non-agglomerated, spherical, and have an average diameter of 10 to 130 millimicrons, the sol having a concentration of up to 50% by weight of $SiO_2$, a relative viscosity, as measured at 10% $SiO_2$ and pH 10, of 1.15 to 1.55 and a specific conductance, as measured at 10% $SiO_2$ and 28° C., of less than $4 \times 10^{-4}$ mho/cm., the amount of hydroxide added being enough to adjust the silica : alkali metal oxide mole ratio to from 130:1 to 500:1, and to the resultant sol adding a water-soluble organic liquid.

12. An aqueous silica sol having a concentration of up to 50% by weight of $SiO_2$, a silica : alkali metal oxide mole ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right) \times 10^{-5} \text{ mho/cm.}$$

where R is the silica : alkali metal oxide mole ratio, and containing amorphous silica in the form of dense, non-agglomerated, spherical particles having an average particle diameter of 10 to 130 millimicrons.

13. An aqueous silica sol having a concentration of up to 50% by weight of $SiO_2$, a silica : lithium oxide mole ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right) \times 10^{-5} \text{ mho/cm.}$$

where R is the silica : lithium oxide mole ratio, and containing amorphous silica in the form of dense, non-agglomerated, spherical particles having an average particle diameter of 10 to 130 millimicrons.

14. An aqueous silica sol having a concentration of up to 50% by weight of $SiO_2$, a silica: sodium oxide mole ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right) \times 10^{-5} \text{ mho/cm.}$$

where R is the silica : sodium oxide mole ratio, and containing amorphous silica in the form of dense, non-agglomerated, spherical particles having an average particle diameter of 10 to 130 millimicrons.

15. An aqueous silica sol having a silica : alkali metal oxide mole ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right) \times 10^{-5} \text{ mho/cm.}$$

where R is the silica : alkali metal oxide mole ratio, and containing amorphous silica in the form of dense, non-agglomerated, spherical particles having an average particle diameter of 10 to 130 millimicrons, in a concentration of from 35 to 50% $SiO_2$ by weight.

16. An aqueous silica sol having a concentration of up to 50% by weight of $SiO_2$, a silica : alkali metal oxide mole ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right) \times 10^{-5} \text{ mho/cm.}$$

where R is the silica : alkali metal oxide mole ratio, and containing amorphous silica in the form of dense, non-agglomerated, spherical particles having an average particle diameter of 10 to 130 millimicrons, the uniformity of size being such that at least 80% of the particles have an average diameter of from 0.5 to 1.7 times the arithmetic mean particle diameter.

17. An aqueous silica sol having a concentration of up to 50% by weight of $SiO_2$, a silica : alkali metal oxide mole ratio of from 150:1 to 300:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right) \times 10^{-5} \text{ mho/cm.}$$

where R is the silica : alkali metal oxide mole ratio, and containing amorphous silica in the form of dense, non-agglomerated, spherical particles having an average particle diameter of 10 to 130 millimicrons.

18. An aqueous silica sol having a silica : alkali metal oxide mole ratio of from 130:1 to 500:1, a relative viscosity of from 1.15 to 1.30 as measured at 10% $SiO_2$ and pH 10, and a specific conductance, as measured at 10% $SiO_2$ and 28° C., of less than $$\left(\frac{10,000}{R}+6\right) \times 10^{-5} \text{ mho/cm.}$$

where R is the silica : alkali metal oxide mole ratio, and containing amorphous silica in the form of dense, non-agglomerated, spherical particles having an average particle diameter of 13 to 60 millimicrons, in a concentration of from 40 to 50% $SiO_2$ by weight.

19. An aqueous silica sol having a silica : alkali metal oxide mole ratio of from 130:1 to 500:1, a relative viscosity of from 1.15 to 1.30 as measured at 10% $SiO_2$ and pH 10, and a specific conductance, as measured at 10% $SiO_2$ and 28° C., of less than $$\left(\frac{10,000}{R}+6\right) \times 10^{-5} \text{ mho/cm.}$$

where R is the silica : alkali metal oxide mole ratio, and containing amorphous silica in the form of dense, non-agglomerated, spherical particles having an average particle diameter of 15 to 30 millimicrons, in a concentration of from 45 to 50% $SiO_2$ by weight.

20. A composition comprising a water-soluble organic liquid and an aqueous silica sol having a concentration of up to 50% by weight of $SiO_2$, a silica : alkali metal oxide mole ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right) \times 10^{-5} \text{ mho/cm.}$$

where R is the silica : alkali metal oxide mole ratio, and containing amorphous silica in the form of dense, non-agglomerated, spherical particles having an average particle diameter of 10 to 130 millimicrons.

21. A composition comprising a water-soluble alcohol and an aqueous silica sol having a concentration of up to 50% by weight of $SiO_2$, a silica : alkali metal oxide mole ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right)\times 10^{-5} \text{ mho/cm.}$$

where R is the silica : alkali metal oxide mole ratio, and containing amorphous silica in the form of dense, non-agglomerated, spherical particles having an average particle diameter of 10 to 130 millimicrons.

22. A composition comprising a water-soluble alcohol and an aqueous silica sol having a silica : alkali metal oxide mole ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right)\times 10^{-5} \text{ mho/cm.}$$

where R is the silica : alkali metal oxide mole ratio, and containing amorphous silica in the form of dense, non-agglomerated, spherical particles having an average particle diameter of 10 to 130 millimicrons, in a concentration of from 35 to 50% $SiO_2$ by weight.

JOSEPH M. RULE.

No references cited.

Certificate of Correction

Patent No. 2,577,485 December 4, 1951

JOSEPH M. RULE

It is hereby certified that error appears in the printed specification of the above numbered patent requiring correction as follows:

Column 4, line 15, for "difficulty is" read *difficulty in*; column 6, line 47, for "6×15⁻⁵" read *6×10⁻⁵*; column 7, line 70, for "form" read *forms*; column 14, line 9, for "sole" read *sol*;

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.*